(12) United States Patent
Ochiai

(10) Patent No.: US 11,763,977 B2
(45) Date of Patent: Sep. 19, 2023

(54) INDUCTOR CORE, ELECTRONIC PEN CORE PORTION, ELECTRONIC PEN, AND INPUT DEVICE

(71) Applicant: KYOCERA Corporation, Kyoto (JP)

(72) Inventor: Hitomi Ochiai, Omihachiman (JP)

(73) Assignee: KYOCERA Corporation, Kyoto (JP)

( * ) Notice: Subject to any disclaimer, the term of this patent is extended or adjusted under 35 U.S.C. 154(b) by 416 days.

(21) Appl. No.: 17/040,729

(22) PCT Filed: Apr. 1, 2019

(86) PCT No.: PCT/JP2019/014539
§ 371 (c)(1),
(2) Date: Sep. 23, 2020

(87) PCT Pub. No.: WO2019/189936
PCT Pub. Date: Oct. 3, 2019

(65) Prior Publication Data
US 2021/0327632 A1  Oct. 21, 2021

(30) Foreign Application Priority Data

Mar. 30, 2018 (JP) ................................. 2018-069857

(51) Int. Cl.
*H01F 27/26* (2006.01)
*G06F 3/0354* (2013.01)
*G06F 3/046* (2006.01)

(52) U.S. Cl.
CPC ....... *H01F 27/263* (2013.01); *G06F 3/03545* (2013.01); *G06F 3/046* (2013.01)

(58) Field of Classification Search
CPC ...... G06F 3/03545; G06F 3/046; G06F 3/033; G06F 3/038; G06F 3/0383; G06F 3/03;
(Continued)

(56) References Cited

U.S. PATENT DOCUMENTS

2016/0349865 A1* 12/2016 Arai .......................... G06F 3/03
2018/0094741 A1* 4/2018 Paulus ................ F16K 31/0675

FOREIGN PATENT DOCUMENTS

EP         3447615 A1      2/2019
JP      2015220256 A  * 12/2015     ............. H01F 27/25
(Continued)

*Primary Examiner* — Mang Tin Bik Lian
*Assistant Examiner* — Matthew T Sarles
(74) *Attorney, Agent, or Firm* — PROCOPIO CORY HARGREAVES AND SAVITCH LLP

(57) ABSTRACT

An inductor core includes a tubular magnetic material body formed of a magnetic material. The magnetic material body includes an inclined portion including an inclined surface which constitutes a peripheral surface of a truncated cone having an outer diameter that increases from one end toward the other end of the tubular magnetic material body; a straight trunk portion which is disposed coaxially with the inclined portion and includes an outer peripheral surface which constitutes a peripheral surface of a cylindrical body which extends from the other end toward the one end and a flange portion which is provided between the inclined portion and the straight trunk portion and connects the inclined portion and the straight trunk portion. An outer peripheral surface of the flange portion has an outer diameter greater than the outer diameter of the inclined portion and an outer diameter of the straight trunk portion.

20 Claims, 7 Drawing Sheets

(58) Field of Classification Search
CPC ...... B43K 24/08; B43K 29/00; B43K 24/084;
B43K 24/16; B43K 24/163; B43K 27/08;
B43K 27/12; B43K 29/08; B43K 7/12;
H01F 3/08; H01F 1/26; H01F 17/045;
H01F 2017/048; H01F 41/0246; H01F
27/006; H01F 27/245; H01F 27/255;
H01F 27/29; H01F 27/292; H01F 27/306;
H01F 5/04; G01D 5/208; G01D 5/24;
G01D 5/2417; H01G 5/16
See application file for complete search history.

(56) References Cited

FOREIGN PATENT DOCUMENTS

| | | | | | |
|---|---|---|---|---|---|
| KR | 20110061935 | A | * | 6/2011 | |
| KR | 1145153 | B1 | * | 5/2012 | ............ H01F 38/14 |
| WO | 2017/183526 | A1 | | 10/2017 | |

* cited by examiner

INDUCTOR CORE, ELECTRONIC PEN CORE PORTION, ELECTRONIC PEN, AND INPUT DEVICE

CROSS-REFERENCE TO RELATED APPLICATIONS

This application is a national stage entry according to 35 U.S.C. 371 of International Application No. PCT/JP2019/014539 filed on Apr. 1, 2019, which claims priority to Japanese Patent Application No. 2018-069857 filed on Mar. 30, 2018, the contents of which are entirely incorporated herein by reference.

TECHNICAL FIELD

The present disclosure invention relates to an inductor core, an electronic pen core portion, an electronic pen, and an input device.

BACKGROUND

For an input device that detects a position in a tablet or a display provided with a position detection sensor and inputs position information to a personal computer (PC), a smartphone, and the like, an electronic pen is used to indicate the position on the position detection sensor.

The detection between the position detection sensor and the electronic pen is enabled with the position detection device, through transmission and reception of a position detection signal by a coupling method such as an electromagnetic inductive coupling method or an electrostatic inductive coupling method (for example, WO 2017/183526 A1 (Patent Literature 1)).

The electronic pen used in such an input device includes an inductor core configured by disposing a magnetic material such as ferrite around a core member of the electronic pen.

SUMMARY

An inductor core according to the disclosure includes a tubular magnetic material body formed of a magnetic material, the tubular magnetic material body including an inclined portion including an inclined surface which constitutes a peripheral surface of a truncated cone having an outer diameter that increases from one end toward the other end of the tubular magnetic material body, a straight trunk portion which is disposed coaxially with the inclined portion and includes an outer peripheral surface which constitutes a peripheral surface of a cylindrical body which extends from the other end toward the one end of the tubular magnetic material body, and a flange portion which is provided between the inclined portion and the straight trunk portion and connects the inclined portion and the straight trunk portion, an outer peripheral surface of the flange portion having an outer diameter greater than the outer diameter of the inclined portion and an outer diameter of the straight trunk portion.

An electronic pen core portion according to the disclosure includes the inductor core described above, and a core member which is inserted into the inductor core such that a tip portion of the core member protrudes from one end of the inductor core.

An electronic pen according to the disclosure includes a housing provided with an opening, and the electronic pen core portion described above, the electronic pen core portion being housed in the housing such that the tip portion of the electronic pen core portion can protrude or protrudes from the opening of the housing.

An input device according to the disclosure includes the electronic pen described above, and a position detection device including a sensor that detects a position which the electronic pen is approaching.

BRIEF DESCRIPTION OF DRAWINGS

Other and further objects, features, and advantages of the disclosure will be more explicit from the following detailed description taken with reference to the drawings wherein.

DETAILED DESCRIPTION

Hereinafter, an inductor core, an electronic pen core portion, an electronic pen, and an input device according to the disclosure will be described in detail with reference to the drawings.

Figure 1:
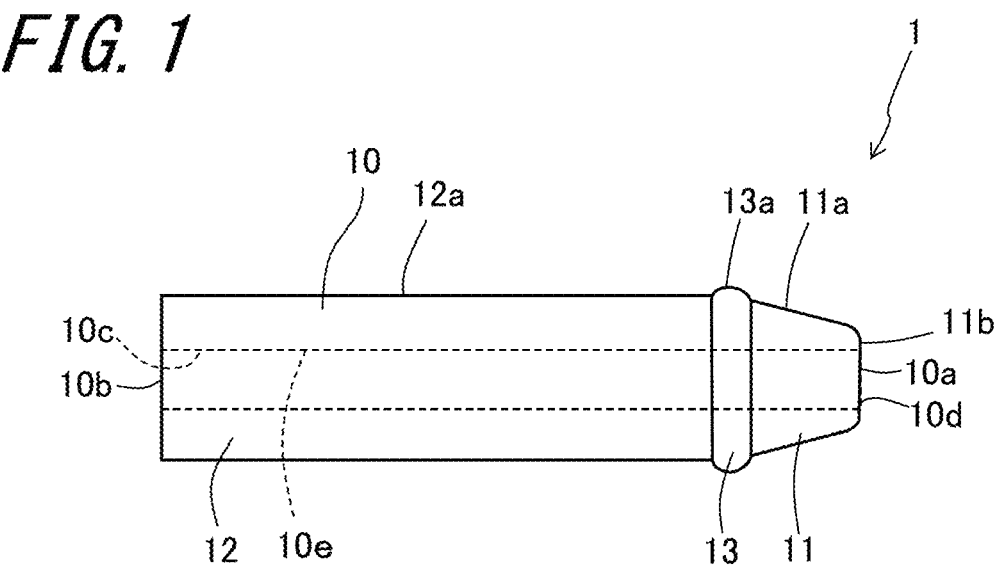
FIG. 1 is a plan view showing an example of an inductor core according to a first embodiment.
Figure 2:
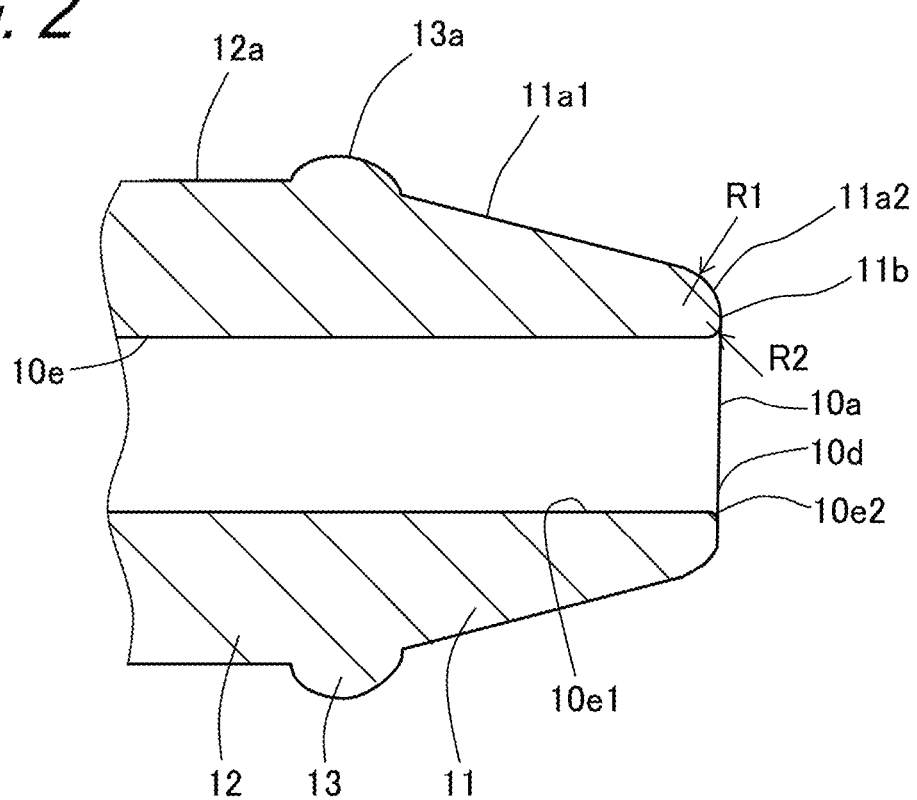
FIG. 2 is a partial cross-sectional view showing an example of the inductor core according to the first embodiment.

FIG. 1 is a plan view showing an example of an inductor core according to a first embodiment. FIG. 2 is a cross-sectional view showing an example of the inductor core according to the first embodiment. An inductor core 1 includes a magnetic material body 10 formed of a magnetic material such as ferrite sintered body.

The inductor core 1 is formed of a tubular magnetic material body 10 and includes a cylindrical hole 10c penetrating from one end 10a to the other end 10b. The magnetic material body 10 includes an inclined portion 11 including an inclined surface 11a which constitutes a peripheral surface of a truncated cone having an outer diameter that increases from the one end 10a toward the other end 10b, a straight trunk portion 12 which is disposed coaxially with the inclined portion 11, and constitutes an outer peripheral surface 12a of a cylindrical body that extends from the other end 10b toward the one end 10a, and a flange portion 13 which is provided between the inclined portion 11 and the straight trunk portion 12 and connects the inclined portion 11 and the straight trunk portion 12. The inclined portion 11, the flange portion 13 and the straight trunk portion 12 are arranged in this order from the one end 10a toward the other end 10b, and an outer peripheral surface 13a of the flange portion 13 has a greater outer diameter than the outer diameter of each of the inclined surface 11a of the inclined portion 11 and the outer peripheral surface 12a of the straight trunk portion 12.

The length from the one end 10a to the other end 10b of the magnetic material body 10 is about 5 mm to 15 mm, and the diameter of the cylindrical hole 10c is about 0.5 mm to 2.0 mm, for example. The length of the straight trunk portion 12 is about 3 mm to 12 mm, and the outer diameter of the straight trunk portion 12 is about 2.0 mm to 3.0 mm. The length of the inclined portion 11 is about 0.5 mm to 2.0 mm, and the outer diameter of the inclined portion 11 on the side of the one end 10a is about 1 mm to 2 mm, and the outer diameter of the inclined portion 11 at the opposite side to the one end 10a is substantially the same as the outer diameter of the straight trunk portion 12. As described above, the inclined portion 11 is tapered toward the one end 10a.

The flange portion 13 may be provided between the inclined portion 11 and the straight trunk portion 12 of the magnetic material body 10, may connect the inclined portion 11 and the straight trunk portion 12, and may include the outer peripheral surface 13a which is a first curved surface. The outer peripheral surface 13a may be a curved surface that is convexly curved outward in the radial direction thereof, and the maximum value of the outer diameter of the outer peripheral surface 13a may be greater than the outer diameters of the inclined portion 11 and the straight trunk portion 12. For example, when the outer diameter of the straight trunk portion 12 is 2.1 mm to 2.5 mm, the maximum value of the outer diameter of the outer peripheral surface 13a is 2.12 mm to 2.72 mm, and it protrudes from the outer peripheral surface 12a of the straight trunk portion 12 by a maximum of 0.02 mm to 0.22 mm.

The inductor core 1 having such a shape is used by inserting a core member described below into the cylindrical hole 10c. The core member is inserted such that the tip portion of the core member is on the side of the one end 10a of the magnetic material body 10. Since the inclined portion 11 has a tapered shape, the one end 10a of the magnetic material body 10 may be brought closer to a position detection device such as a tablet that detects the position by an electromagnetic induction method or otherwise. As described above, by forming the inclined portion 11 of the magnetic material body 10 in a tapered shape, the accuracy of the position detection of the position detection device is improved, but since the tip portion of the magnetic material body 10 is tapered, there is a concern about insufficient strength and deformation of the magnetic material body 10. However, since the flange portion 13 includes a portion having a greater outer diameter than those of the inclined portion 11 and the straight trunk portion 12, and the magnetic material body 10 has a greater rigidity compared to the shape without the flange portion 13 in which the inclined portion 11 and the straight trunk portion 12 are directly connected to each other, it is thus possible to provide the inductor core 1 with high reliability.

In the cross section along a central axis of the magnetic material body 10, the outer diameter of the inclined portion 11 increases from the one end 10a toward the other end 10b. That is, the inclined portion 11 is tapered toward the one end 10a. The inclined surface 11a may include an inclined surface 11a1 which is a linear portion in a cross-sectional view, and a rounded inclined surface 11a2. Here, the inclined surface 11a1 may form the peripheral surface of a truncated cone. The inclined surface 11a2 near the one end 10a may be a convex curved surface. In such a configuration, the inclined surface 11a1 of the inclined portion 11 and an end surface 11b of the inclined portion 11 are connected to each other at the inclined surface 11a2 that is a part of the inclined surface 11a and that is a second convex curved surface. As described above, when the inclined surface 11a1 and the end surface 11b are connected to each other by the inclined surface 11a2 which is the convex curved surface, the possibility of damage may be reduced when, for example, the end surface 11b of the inclined portion 11 comes into contact with the housing of the electronic pen. When the electronic pen is tilted and brought into contact with the surface of a tablet or the like, in addition to the core, the tip including the one end 10a of the magnetic material body 10 may also come into contact with the tablet or the like, but because the inclined surface 11a1 and the end surface 11b of the inclined portion 11 are connected by the inclined surface 11a2 which is the convex curved surface, there is no presence of a pointed portion, and it is thus possible to reduce the risk of damaging the surface of the tablet or the like by the inductor core 1.

For an inner peripheral surface 10e of the cylindrical hole 10c of the magnetic material body 10, the inner peripheral surface 10e near an opening 10d at the inclined portion 11 side may be rounded. The inner peripheral surface 10e may include an inner peripheral surface 10e1, and an inner peripheral surface 10e2 that is a third convex curved surface and that connects the inner peripheral surface 10e1 and the end surface 11b of the inclined portion 11. When the inner surface of the cylindrical hole 10c and the end surface 11b of the inclined portion 11 are connected to each other by the inner peripheral surface 10e2 which is the convex curved surface, because the concentration of stress may be reduced and the possibility of damaging the magnetic material body 10 may be reduced when, for example, the core is pressed against the surface of the tablet or the like, the inductor core 1 having high reliability may be realized.

In the cross section along the central axis of the magnetic material body 10, when the radius of curvature of the inclined surface 11a2 which connects the inclined surface 11a1 of the inclined portion 11 and the end surface 11b of the inclined portion 11 is R1, and the radius of curvature of the inner peripheral surface 10e2 which connects the inner peripheral surface 10e1 of the cylindrical hole 10c and the end surface 11b of the inclined portion 11 is R2, the radius of curvature R1 of the inclined surface 11a2 may be greater than the radius of curvature R2 of the inner peripheral surface 10e2. The radius of curvature R1 of the inclined surface 11a2 is 0.1 mm to 0.2 mm, for example, and the radius of curvature R2 of the inner peripheral surface 10e2 is 0.02 mm to 0.08 mm, for example.

Figure 3:
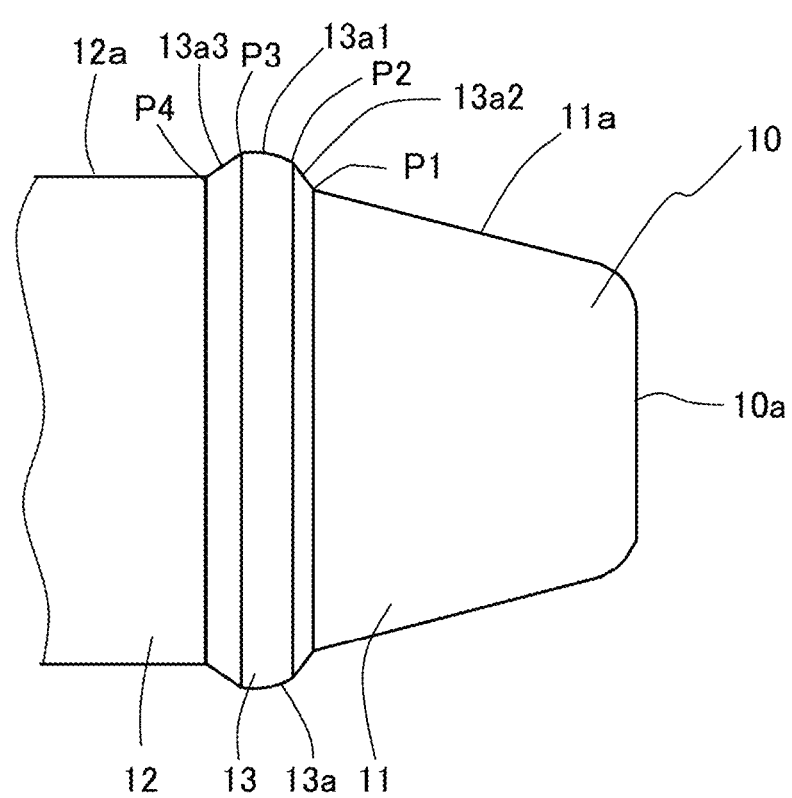
FIG. 3 is a partial plan view showing an example of an inductor core according to a second embodiment.
Figure 4:
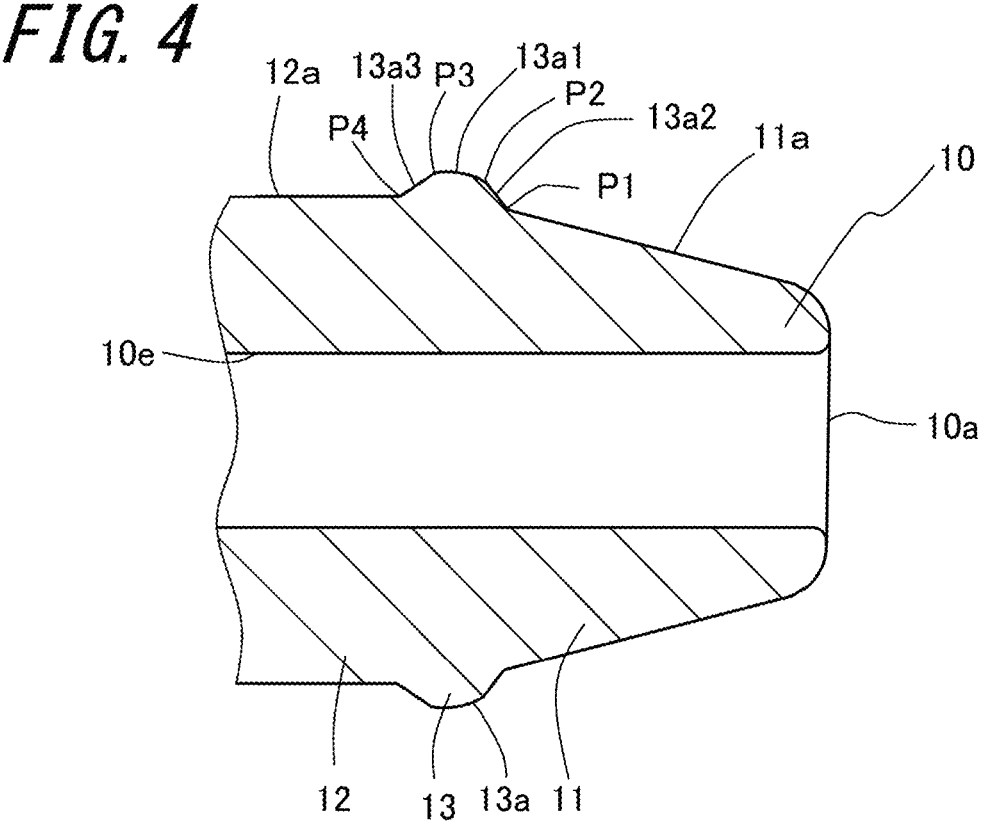
FIG. 4 is a partial cross-sectional view showing an example of the inductor core according to the second embodiment.

FIG. 3 is a partial plan view showing an example of an inductor core according to a second embodiment, and FIG. 4 is a partial cross-sectional view showing an example of the inductor core according to the second embodiment. The inductor core 1 according to the second embodiment is different from the inductor core 1 according to the first embodiment in the form of the flange portion 13. In the second embodiment, the outer peripheral surface 13a of the flange portion 13 is formed by combining an outer peripheral surface 13a1 which is a first curved surface, an outer peripheral surface 13a2 which is a first connecting surface, and an outer peripheral surface 13a3 which is a second connecting surface. The outer peripheral surface 13a1 is a curved surface that is convexly curved outward in the radial direction thereof, and the outer peripheral surface 13a2 is a surface that connects an edge portion P2 of the outer peripheral surface 13a1 on the side of the one end 10a and an edge portion P1 of the inclined surface 11a on the side of the other end 10b. The outer peripheral surface 13a3 is a surface that connects an edge portion P3 of the outer peripheral surface 13a1 on the side of the other end 10b and an edge portion P4 of the outer peripheral surface 12a of the straight trunk portion 12 on the side of the one end 10a. The outer peripheral surface 13a2 is inclined such that an outer diameter thereof increases from the edge portion P1 of the inclined surface 11a on the side of the other end 10b, toward the edge portion P2 of the outer peripheral surface 13a1 on the side of the one end 10a, and the outer peripheral surface 13a3 is inclined such that an outer diameter thereof increases from the edge portion P4 of the outer peripheral surface 12a of the straight trunk portion 12 on the side of the one end 10a, toward the edge portion P3 of the outer peripheral surface 13a1 on the side of the other end 10b.

Since the flange portion 13 including the outer peripheral surface 13a1, the outer peripheral surface 13a2, and the outer peripheral surface 13a3 as described above includes a portion having a greater outer diameter than those of the inclined portion 11 and the straight trunk portion 12, the magnetic material body 10 has a greater strength compared to the shape without the flange portion 13 in which the inclined portion 11 and the straight trunk portion 12 are directly connected to each other, and it is thus possible to increase the reliability of the inductor core 1.

The magnetic material body 10 is formed of ceramics containing ferrite as a main component, the ceramics including oxides of Fe, Zn, Ni, and Cu, and a coefficient of variation CV value of average crystal grain 105 sizes of the ceramics expressed by the following formula (1) may be 0.08 or more and 0.3 or less:

$$CV = \sigma/x \quad (1)$$

where, x is an average value of the average crystal grain sizes of the ceramics, and σ is a standard deviation of the average crystal grain sizes of the ceramics.

When the coefficient of variation CV is 0.08 or more, the grain size of the crystal grains varies appropriately, and small crystal grains are arranged among large crystal grains, thereby increasing the fracture toughness. When the coefficient of variation CV is 0.3 or less, the ratio of crystal grains having a large grain size with respect to the standard deviation increases, and the magnetic permeability is thereby increased. When the coefficient of variation CV is 0.08 or more and 0.3 or less, both high fracture toughness and high permeability may be achieved.

In particular, the coefficient of variation CV is preferably 0.1 or more and 0.2 or less. In the example, the average crystal grain size may be obtained as follows.

First, the fractured surface of the inductor core 1 is polished with a copper disk using diamond abrasive grains having an average particle diameter $D_{50}$ of 3 μm, and then is ground on a tin disk using diamond abrasive grains having an average particle diameter $D_{50}$ of 0.5 μ. The polished surface obtained by these polishing is etched at a temperature of 950° C. until the crystal grains and the grain boundary layer may be distinguished from each other so that an observation surface is obtained.

Within a range of 155 μm×115 μm of the observation surface at 5000× magnification with a scanning electron microscope, six straight lines of a same length, of 100 μm, for example, are drawn around any point radially, and the lengths of these six straight lines are divided by the number of crystals present on each line, so that the average crystal grain size can be obtained.

Figure 8:
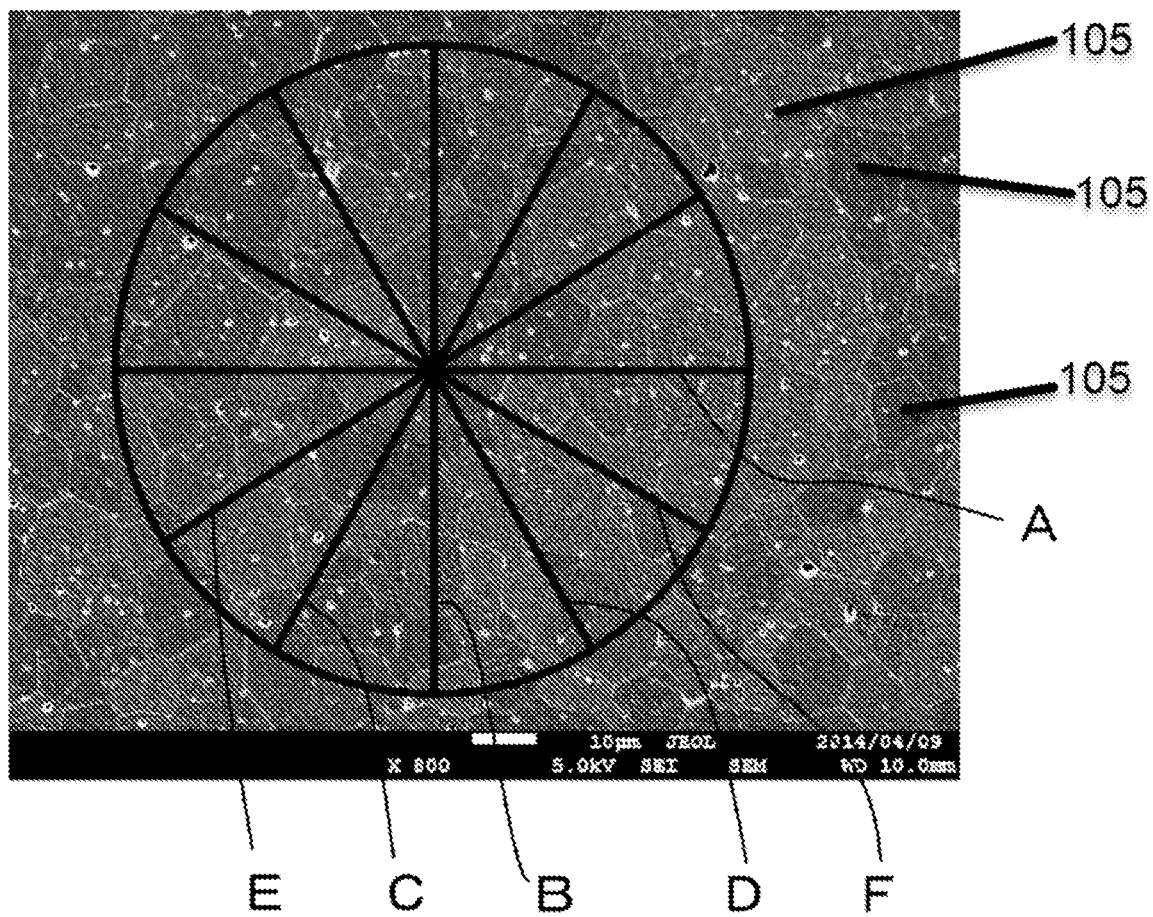
FIG. 8 is a photograph showing an example of an observation surface of an inductor core and how straight lines are drawn.

FIG. 8 is a photograph showing an example of the observation surface of the inductor core and how the straight lines are drawn. The straight lines A to F shown in FIG. 8 are straight lines each having a length of 100 μm, and the average crystal grain size may be obtained using the straight lines. The average, standard deviation, and coefficient of variation CV of the average crystal grain sizes may be calculated for each of 42 average crystal grain sizes by selecting 7 such observation surfaces.

A kurtosis Ku value of the average crystal grain 105 sizes may be 0 or more.

When the kurtosis Ku of the average crystal grain sizes is within the above range, since the variation of the grain size of the crystal grain is reduced, the agglomeration of the pores is reduced, and it is thus possible to reduce the degranulation from the contour or the inside of the pores. Particularly, the kurtosis Ku of the average crystal grain sizes is preferably 1 or more.

Here, the kurtosis Ku is an index (statistic) indicating how much the peak and tail of the distribution differ in the normal distribution, in which when the kurtosis Ku>0, the distribution has a sharp peak, when the kurtosis Ku=0, the distribution is normal, and when the kurtosis Ku<0, the distribution has a rounded peak.

The kurtosis Ku of the average crystal grain sizes may be obtained by using a function Kurt provided in Excel (registered trademark, Microsoft Corporation).

A skewness Sk value of the average crystal grain 105 sizes may be 0 or more.

When the skewness Sk of the average crystal grain sizes is within the above range, since the distribution of the grain size of the crystal grains is moving in the direction of the smaller grain size, the agglomeration of the pores is reduced, and it is thus possible to further reduce the degranulation from the contour or the inside of the pores.

Here, the skewness Sk is an index (statistic) indicating how much the distribution is distorted from the normal distribution, that is, the left-right symmetry of the distribution, in which, when the skewness Sk>0, the tail of the distribution is moved to the right side, when the skewness Sk=0, the distribution is in left-right symmetry, and when the skewness Sk<0, the tail of the distribution is moved to the left side.

The skewness Sk of the average crystal grain sizes may be obtained by using the function SKEW provided in Excel (registered trademark, Microsoft Corporation).

At least the inclined portion 11 may contain Mo, which is contained more in a grain boundary layer than in crystal grains.

When Mo is contained more in the grain boundary layer than in the crystal grains 105, since the binding force between the crystal grains 105 containing ferrite as a main component is reduced, the inclined surface 11a2 having a large radius of curvature R1 may be easily obtained.

The Mo content in the crystal grains and in the grain boundary layer may be subjected to elemental analysis by using a transmission electron microscope and an energy dispersive X-ray spectrometer (EDS) attached to the transmission electron microscope.

The magnetic material body 10 used for the inductor core 1 may be manufactured as follows. First, as starting materials, oxides of Fe, Zn, Ni and Cu, or metal salts such as carbonates and nitrates for producing oxides by firing are prepared. Here, the average particle diameter is 0.5 μm or more and 5 μm or less, respectively, when Fe is iron oxide ($Fe_2O_3$), Zn is zinc oxide (ZnO), Ni is nickel oxide (NiO) and Cu is copper oxide (CuO), for example. Subsequently, in producing a first raw material formed of a calcined powder containing $Fe_2O_3$—ZnO—NiO and a second raw material formed of a calcined powder containing $Fe_2O_3$—CuO, iron oxide, zinc oxide, and nickel oxide are weighed in desired amounts for the first raw material. For the second raw material, iron oxide and copper oxide are weighed in desired amounts. In the example, regarding the addition amount of iron oxide in the production of the first raw material and the second raw material, the amount of iron oxide added in the production of the second raw material is equimolar in percentage to that of copper oxide, for example, and the remaining amount is used in the production of the first raw material.

Then, the powders weighed for the first raw material and the second raw material are pulverized and mixed with different ball mills or vibration mills, respectively, and then are calcined in a reducing atmosphere at 750° C. for 2 hours or longer in the production of the first raw material and in a reducing atmosphere at 650° C. for 2 hours or longer in the production of the second raw material, respectively to obtain a calcined body, respectively.

Next, the calcined bodies to be the first raw material and the second raw material are put into separate ball mills or vibration mills and pulverized to obtain the first raw material and the second raw material formed of the calcined powder. Here, particularly, the calcined body as the second raw material is pulverized so that the average particle diameter $D_{50}$ is 0.7 μm or less. Then, the first raw material and the second raw material are weighed and mixed in a desired amount, and then recalcined in the atmosphere under the conditions of 600° C. or higher and 700° C. or lower and a heating rate of 100° C/h or lower to obtain a calcined body synthesized into ferrite formed of oxides of Fe, Zn, Ni and Cu.

Next, the calcined body obtained by the re-calcination is put into the ball mill, the vibration mill, or the like and pulverized, is made into a slurry by adding a predetermined amount of binder or the like, and granulated by spraying the slurry using a spray dryer to obtain spherical granules.

Here, when obtaining the inductor core 1 in which at least the inclined portion 11 contains Mo, which is contained more in the grain boundary layer than in the crystal grains, with respect to 100 parts by mass of the calcined body obtained by the re-calcination, for example, 0.01 part by mass or more and 0.03 part by mass or less of a powder of molybdenum oxide ($MoO_3$) is added to form a slurry, and the slurry may be sprayed for granulation to obtain spherical granules.

Then, the obtained spherical granules are press-molded to obtain a molded body having a predetermined shape. After that, the molded body is subjected to a degreasing treatment in a degreasing furnace in the range of 400° C. to 800° C. to obtain a degreased body, which is then held and fired in a firing furnace at a maximum temperature of 1000° C. to 1200° C. for 2 to 5 hours to form the magnetic material body 10, so that the inductor core 1 according to the present embodiment may be obtained.

Since the inclined portion 11, the straight trunk portion 12 and the flange portion 13 of the magnetic material body 10 according to the present embodiment are formed by press molding, there is no need to carry out a process such as cutting, and thus the cost may be reduced. When the post-processing such as cutting is carried out, the surface may be deteriorated by the post-processing to impair the characteristics of the inductor core, but in the present embodiment, the inductor core 1 is not processed after firing and the surface deterioration is prevented. As a result, the inductor core 1 having high reliability may be formed.

Figure 5:
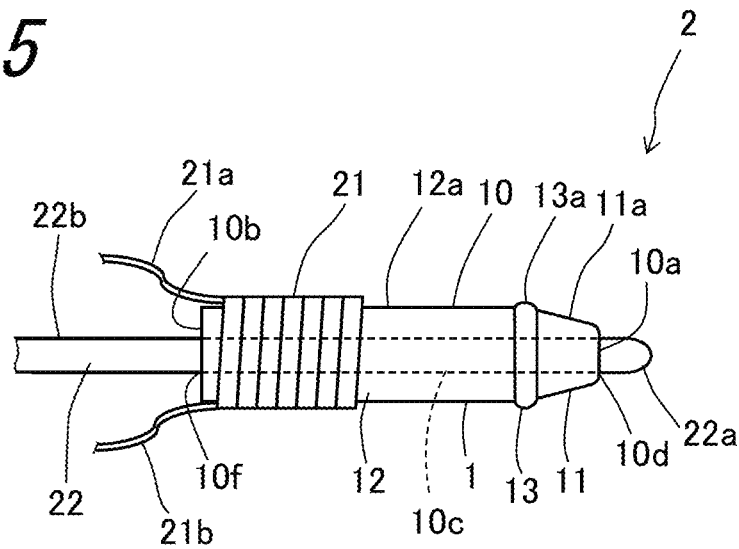
FIG. 5 is a plan view showing an example of an electronic pen core portion according to an embodiment.

FIG. 5 is a plan view showing an example of an electronic pen core portion according to an embodiment. The electronic pen core portion 2 includes the inductor core 1, a coil 21 wound around the magnetic material body 10 of the inductor core 1, and a core member 22 inserted into the cylindrical hole 10c of the magnetic material body 10. Such an electronic pen core portion 2 may be built in the electronic pen of the input device such as an electromagnetic induction type tablet.

The core member 22 may be formed of a metal rod such as SUS304 or SUS316 that is not likely to be magnetized, metal material other than SUS, ceramics, or resin. The core member 22 may be one that is capable of actually writing, such as a ballpoint pen core. The core member 22 is inserted into the cylindrical hole 10c of the magnetic material body 10 and fixed therein. The core member 22 is fixed in the magnetic material body 10 at a position such that the tip portion 22a protrudes from the opening 10d on the one end 10a side of the magnetic material body 10 by about 1 to 2 mm. The magnetic material body 10 has a tapered shape toward the tip portion 22a of the core member 22. A rear end portion 22b of the core member 22 protrudes from an opening 10f on the other end 10b of the magnetic material body 10.

The coil 21 formed by winding an enamel wire or the like is arranged on the outer peripheral surface 12a of a region of the straight trunk portion 12 of the magnetic material body 10, which is close to the other end 10b. The coil 21 is wound with a width of about 8 mm to 12 mm around a portion of the straight trunk portion 12 of the magnetic material body 10, which is close to the other end side, and fixed thereon. The terminals 21a and 21b of the coil 21 are connected to a circuit board (not shown).

When the electronic pen core portion 2 is brought into contact with the surface of a position detection device such as a tablet, force is applied from the core member 22 to the magnetic material body 10, but since the maximum outer diameter of the flange portion 13 is greater than the maximum outer radii of the inclined portion 11 and the straight trunk portion 12, the magnetic material body 10 is less likely to be damaged, so that the electronic pen core portion 2 having high reliability may be realized.

Figure 6:
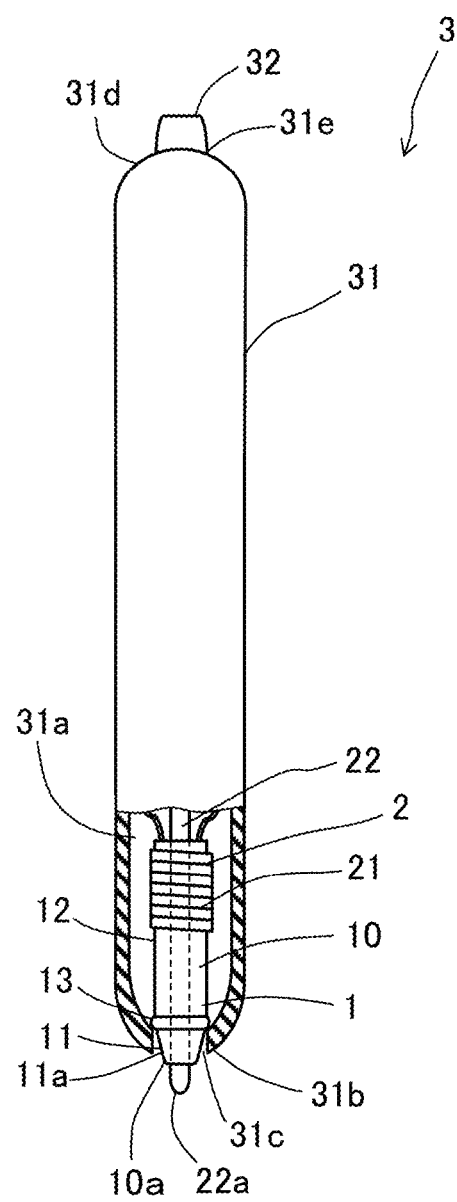
FIG. 6 is a plan view showing an example of an electronic pen according to an embodiment.

FIG. 6 is a plan view showing an electronic pen according to an embodiment. An electronic pen 3 is shown with a part of the housing 31 thereof removed. The electronic pen core portion 2 is housed in the housing 31 to form the electronic pen 3. The electronic pen 3 is configured to house the electronic pen core portion 2 and the circuit board (not shown) in a hollow portion 31a of the tubular housing 31. Such an electronic pen 3 may be used as a position input means in the input device such as an electromagnetic induction type tablet. The tip portion 31b of the housing 31 is provided with an opening 31c through which the tip portion 22a of the core member 22 may protrude, and configured such that the tip portion 22a may protrude from the opening 31c or may be housed in the housing 31 by a knock mechanism.

For example, the rear end 31d of the housing 31 is provided with an opening 31e, and a knock rod 32 protrudes from the opening 31e. The user may press the knock rod 32 to move the tip portion 22a of the core member 22 into and out of the housing 31. While the tip portion 22a of the core member 22 is configured to be moved into and out of the opening 31c in the present embodiment, the tip portion 22a of the core member 22 may be fixed in the state of protruding from the opening 31c, in which case, the knock mechanism is unnecessary.

Since the tip portion 31b of the housing 31 is tapered, the outer periphery of the magnetic material body 10 and the inner surface of the housing 31 may come into contact with each other, but in that case, because the inclined portion 11 is inclined and the flange portion 13 includes the convex outer peripheral surface 13a, the possibility of the magnetic material body 10 being damaged may be reduced, and it is thus possible to realize the electronic pen 3 having high reliability.

Figure 7:
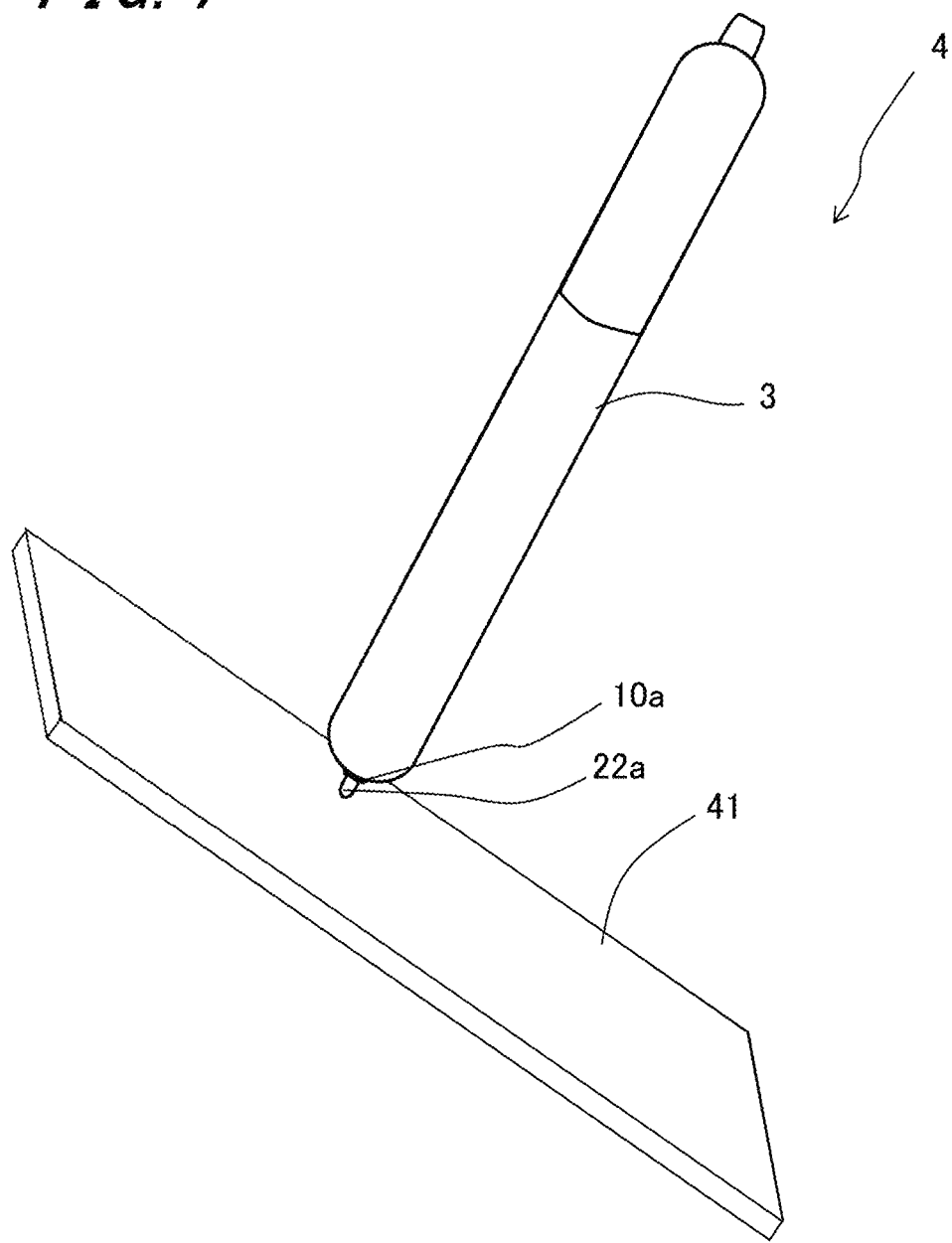
FIG. 7 is a perspective view showing an example of an input device according to an embodiment.

FIG. 7 is a perspective view showing an input device according to an embodiment. An input device 4 includes the electronic pen 3, and a tablet 41 that is a position detection device including a sensor that detects a position. The input device 4 may detect a position at which the tip portion 22a of the core member 22 comes into contact with the tablet 41. In addition to the tablet 41, the position detection device may be a mobile terminal equipped with a touch panel display, or the like. The electromagnetic induction may be used as the position detection method for the input device 4.

For example, with the shape of the inclined portion 11 of the magnetic material body 10, which is tapered toward the one end 10a, even when the one end 10a of the magnetic material body 10 built in the electronic pen 3 approaches the tablet 41, the magnetic material body 10 is less likely to be damaged, and the surface of the tablet 41 is less likely to be damaged by the magnetic material body 10, so that the input device 4 having high reliability may be realized.

The disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description and all changes which come within the meaning and the range of equivalency of the claims are therefore intended to be embraced therein.

REFERENCE SIGNS LIST

1: Inductor core
2: Electronic pen core portion
3: Electronic pen
4: Input device
10: Magnetic material body
10a: One end
10b: Other end
11: Inclined portion
11a: Inclined surface
12: Straight trunk portion
12a: Outer peripheral surface
13: Flange portion
13a: Outer peripheral surface

The invention claimed is:

1. An inductor core, comprising:
a tubular magnetic material body formed of magnetic material,
the tubular magnetic material body comprising
an inclined portion comprising an inclined surface which constitutes a peripheral surface of a truncated cone having an outer diameter that increases from one end toward the other end of the tubular magnetic material body;
a straight trunk portion which is disposed coaxially with the inclined portion and comprises an outer peripheral surface which constitutes a peripheral surface of a cylindrical body which extends from the other end toward the one end of the tubular magnetic material body; and
a flange portion which is provided between the inclined portion and the straight trunk portion and connects the inclined portion and the straight trunk portion,
an outer peripheral surface of the flange portion having an outer diameter greater than the outer diameter of the inclined portion and an outer diameter of the straight trunk portion, wherein the outer peripheral surface of the flange portion comprises a first curved surface, and wherein the outer peripheral surface of the flange portion further comprises a first connecting surface which connects an edge portion of the first curved surface on a side of the one end and an edge portion of the inclined surface on a side of the other end.

2. The inductor core according to claim 1, wherein the first curved surface is convexly curved outward in a radial direction thereof.

3. The inductor core according to claim 2, wherein the outer peripheral surface of the flange portion further comprises a second connecting surface which connects an edge portion of the first curved surface on a side of the other end and an edge portion of the outer peripheral surface of the straight trunk portion on a side of the one end,
the first connecting surface is inclined such that an outer diameter thereof increases from the edge portion of the inclined surface on the side of the other end, toward the edge portion of the first curved surface on the side of the one end, and
the second connecting surface is inclined such that an outer diameter thereof increases from the edge portion of the outer peripheral surface of the straight trunk portion on the side of the one end, toward the edge portion of the first curved surface on the side of the other end.

4. The inductor core according to claim 1, wherein the inclined surface of the inclined portion and an end surface of the inclined portion are connected by a second convex curved surface.

5. The inductor core according to claim 4, wherein an inner peripheral surface of the inclined portion and the end surface of the inclined portion are connected by a third convex curved surface, and a radius of curvature of the third convex curved surface is smaller than a radius of curvature of the second convex curved surface.

6. The inductor core according to claim 1, wherein the magnetic material is formed of ceramics comprising ferrite as a main component, the ceramics comprising oxides of Fe, Zn, Ni and Cu, and a coefficient of variation CV value of average crystal grain sizes of the ceramics expressed by the following formula (1) is 0.08 or more and 0.3 or less:

$$CV = \sigma x \qquad (1)$$

where,
x is an average value of the average crystal grain sizes of the ceramics, and
σ is a standard deviation of the average crystal grain sizes of the ceramics.

7. The inductor core according to claim 6, wherein a kurtosis Ku value of the average crystal grain sizes is 0 or more.

8. The inductor core according to claim 6, wherein a skewness Sk value of the average crystal grain sizes is 0 or more.

9. The inductor core according to claim 6, wherein at least the inclined portion comprises Mo, which is contained more in a grain boundary layer than in crystal grains.

10. An electronic pen core portion, comprising:
the inductor core according to claim 1; and a core member which is inserted into the inductor core such that a tip portion of the core member protrudes from one end of the inductor core.

11. An electronic pen, comprising:

a housing provided with an opening; and the electronic pen core portion according to claim 10, the electronic pen core portion being housed in the housing such that the tip portion of the electronic pen core portion can protrude or protrudes from the opening of the housing.

12. An input device, comprising:

the electronic pen according to claim 11; and a position detection device comprising a sensor that detects a position which the electronic pen is approaching.

13. An inductor core, comprising:

a tubular magnetic material body formed of magnetic material, the tubular magnetic material body comprising an inclined portion comprising an inclined surface which constitutes a peripheral surface of a truncated cone having an outer diameter that increases from one end toward the other end of the tubular magnetic material body;

a straight trunk portion which is disposed coaxially with the inclined portion and comprises an outer peripheral surface which constitutes a peripheral surface of a cylindrical body which extends from the other end toward the one end of the tubular magnetic material body; and a flange portion which is provided between the inclined portion and the straight trunk portion and connects the inclined portion and the straight trunk portion, an outer peripheral surface of the flange portion having an outer diameter greater than the outer diameter of the inclined portion and an outer diameter of the straight trunk portion, wherein the outer peripheral surface of the flange portion comprises a first curved surface, and wherein the outer peripheral surface of the flange portion further comprises a first connecting surface which connects an edge portion of the first curved surface on a side of the other end and an edge portion of the outer peripheral surface of the straight trunk portion on a side of the one end.

14. The inductor core according to claim 13, wherein the first curved surface is convexly curved outward in a radial direction thereof.

15. The inductor core according to claim 14, wherein the outer peripheral surface of the flange portion further comprises a second connecting surface which connects an edge portion of the first curved surface on a side of the one end and an edge portion of the inclined surface on a side of the other end, and, the second connecting surface is inclined such that an outer diameter thereof increases from the edge portion of the inclined surface on the side of the other end, toward the edge portion of the first curved surface on the side of the one end, and the first connecting surface is inclined such that an outer diameter thereof increases from the edge portion of the outer peripheral surface of the straight trunk portion on the side of the one end, toward the edge portion of the first curved surface on the side of the other end.

16. The inductor core according to claim 13, wherein the inclined surface of the inclined portion and an end surface of the inclined portion are connected by a second convex curved surface.

17. The inductor core according to claim 16, wherein an inner peripheral surface of the inclined portion and the end surface of the inclined portion are connected by a third convex curved surface, and a radius of curvature of the third convex curved surface is smaller than a radius of curvature of the second convex curved surface.

18. An electronic pen core portion, comprising:

the inductor core according to claim 13; and a core member which is inserted into the inductor core such that a tip portion of the core member protrudes from one end of the inductor core.

19. An electronic pen, comprising:

a housing provided with an opening; and the electronic pen core portion according to claim 18, the electronic pen core portion being housed in the housing such that the tip portion of the electronic pen core portion can protrude or protrudes from the opening of the housing.

20. An input device, comprising:

the electronic pen according to claim 19; and a position detection device comprising a sensor that detects a position which the electronic pen is approaching.

* * * * *